Patented Feb. 20, 1934

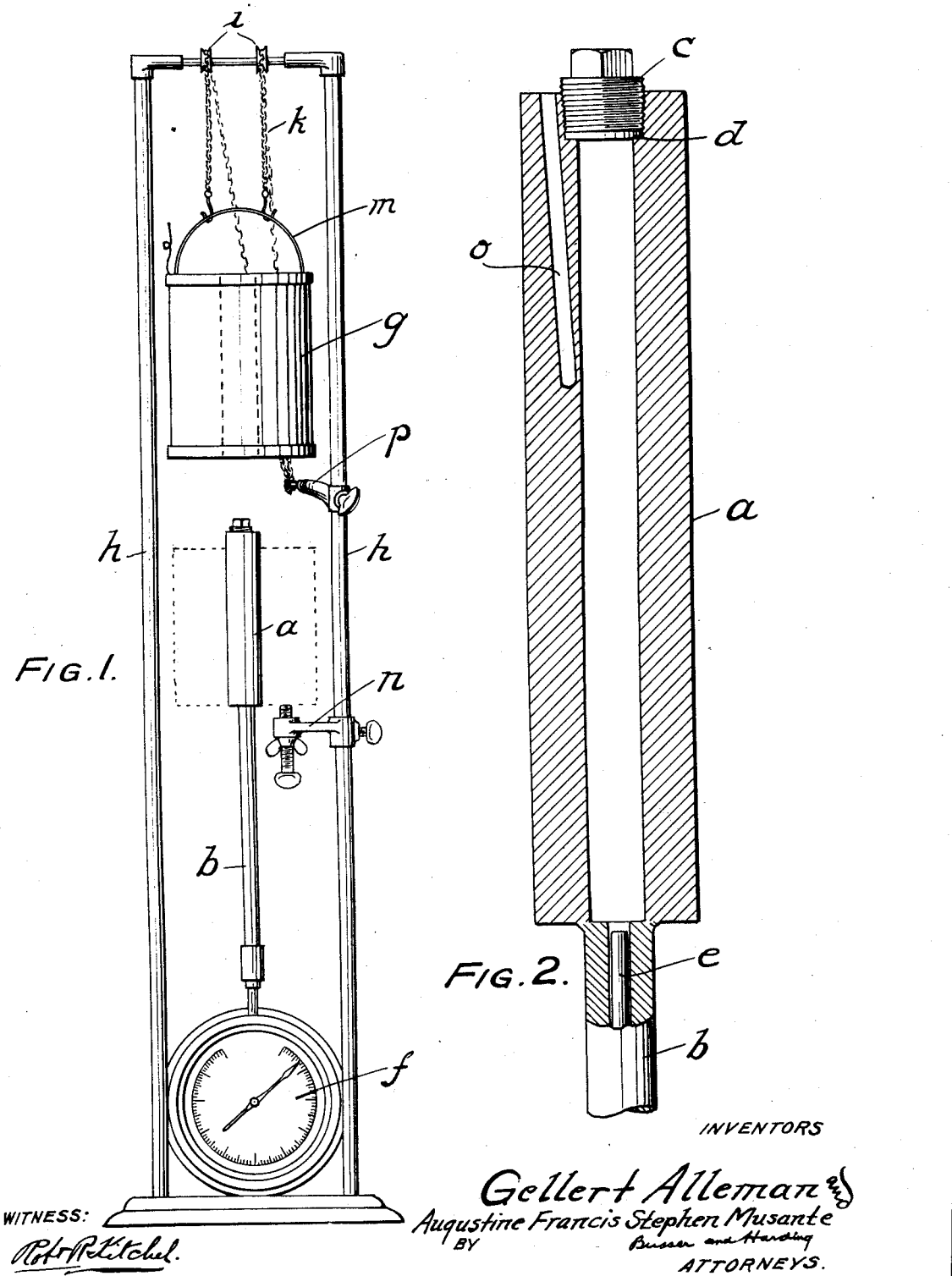

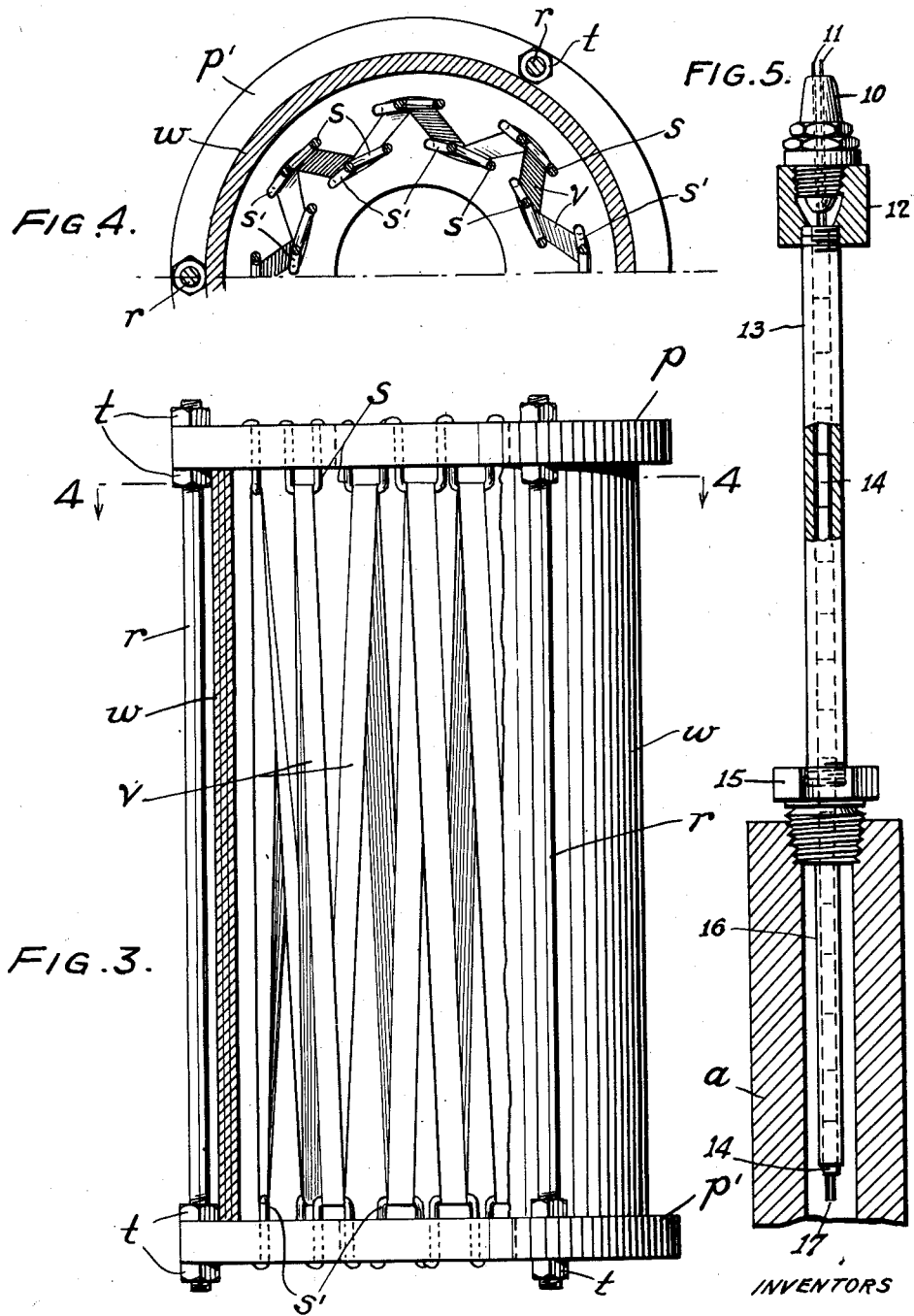

1,947,821

UNITED STATES PATENT OFFICE 1,947,821

APPARATUS FOR DETERMINING CRITICAL PRESSURES

Gellert Alleman, Wallingford, and Augustine Francis Stephen Musante, Media, Pa., assignors to Sun Oil Company, Philadelphia, Pa., a corporation of New Jersey Application May 31, 1932. Serial No. 614,498

7 Claims. (Cl. 73—151)

The object of the invention is to provide an apparatus for determining the critical pressure of a substance, that is, that pressure which will just liquefy the gas of such substance at its critical temperature. For the determination of the critical pressure of many substances, including stable hydrocarbons, satisfactory means are known; but such means are unreliable or impracticable, if indeed they can be said to be operative, when applied to other substances, particularly complex mixtures of hydrocarbons which comprise crude oil and distillates thereof.

In the determination of the critical temperatures and of the critical pressures of compounds such as water and benzene, no special contrivances for rapid heating are required, because these compounds are stable and do not break down during the time required to make the determinations. In the determination of the critical temperatures and of the critical pressures of a mixture of petroleum hydrocarbons, heating at a slow rate, through a range of temperatures under the critical temperature, effects "cracking" of the mixture; that is, many of the hydrocarbons break down to produce new hydrocarbons. These new hydrocarbons individually have critical temperatures different from those which are broken down to produce them. Since (it is believed) the critical temperature of a mixture of substances is the average of the critical temperature of the individual components (assuming equal amounts of all components), it will be understood that when a mixture of hydrocarbons is substantially cracked, necessarily it has a critical temperature different from that of the mixture before cracking. Cracking is a factor of both temperature and time. If the hydrocarbon mixture is heated with sufficient rapidity through its cracking range, there will be no substantial amount of cracking. We have found that, in the case of gas oil—a typical mineral oil fraction—not over about three minutes should elapse from the time it reaches a temperature of 700° F. until it reaches its critical temperature. Such slight amount of cracking as occurs in this short period of time does not interfere with the attainment of reasonably and sufficiently accurate results. After reaching the critical temperature the heating should cease in order to avoid abnormally high and dangerous pressures.

It is therefore necessary to devise means whereby the hydrocarbon oil or other substance whose critical pressure is to be determined shall be heated very rapidly after entering the cracking zone temperature of (say) 370° C. (698° F.) and above. It is also necessary that the heating means shall be of such character that transfer of heat therefrom to the substance may be arrested as soon as the critical temperature of the substance has been reached.

Another difficulty is in so positioning the temperature responsive instrument that it will be subject to the same temperature as the oil.

The apparatus shown in the drawings, which represents one embodiment of our invention, has been successfully used and its accuracy demonstrated by using it to determine the critical pressures of stable substances whose critical pressures have been otherwise authoritatively determined.

In the drawings:

Fig. 1 is a front view of the apparatus.

Fig. 2 is a central sectional view of the cylinder for holding the substance whose critical pressure is to be determined.

Fig. 3 is a detail view, partly broken away, of the heating element.

Fig. 4 is a partial sectional plan view of the heating element on the line 4—4 of Fig. 3.

Fig. 5 is a vertical sectional view of a substitute thermocouple arrangement.

The oil whose critical pressure is to be determined is placed in a cold rolled steel cylinder or tube $a$ ten inches long having an outside diameter of two inches and a bore of 1⅛ of an inch. To the bottom of this cylinder is connected, by welding or otherwise, a heavy steel tube $b$ of 1¾ of an inch outside diameter and a bore of slightly over a quarter of an inch. The tube $b$ communicates at its bottom with a carefully calibrated pressure gauge $f$. The top of the cylinder $a$ is closed by any suitable closure, as, for example, by a plug $c$, which is made tight by means of a copper-asbestos gasket $d$ which fits in a seat between the plug and the cylinder. The pressure within the cylinder $a$ is transmitted to the gauge by the column of oil in tube $b$. In order to decrease the volume of oil in tube $b$ (which is out of the heating zone), a steel rod $e$ one-fourth of an inch in diameter is placed in the bore of the tube, thus providing an annular space for liquid of very small total volume. Of course the tube $b$ may be specially constructed with a bore of such very small diameter that the expedient of inserting an inside rod will be unnecessary.

The heating unit may be any suitable annular electrically heated contrivance which will transmit radiant (instead of conducted) heat and which will not transmit heat after the circuit thereto is opened. It is preferred to wind a suitable resistance ribbon on a skeleton which is protected from the atmosphere by means of an asbestos covering. Preferably, the resistance ribbon is made of a suitable metal alloy. We have found a nickel-chrome resistance ribbon to be particularly efficient and to meet the requirements above specified. The resistance ribbon may be composed of any other metal alloy that can be rapidly heated. The heating unit $g$ may be as long as, or longer than, the cylinder $a$, but must at least be nearly as long. It should be so shaped and arranged that it can be readily slipped over, and removed from, the cylinder $a$. The electric current controlling means, which should include a rheostat and a potentiometer, are not shown, since they form no part of the invention.

One efficient way of constructing the heating element is shown in Figs. 3 and 4. The skeleton of the heating element therein shown comprises two discs $p$, $p'$ of any material which is waterproof, fire-resistant and which does not conduct the electric current. Such a material is "transite", which consists largely of asbestos and other fire-resisting materials which are held together by a binder and subjected to pressure and heat. These discs are held spaced apart in fixed relation by rods $r$ and nuts $t$. The discs $p$, $p'$ carry nickel wire stirrups $s$, $s'$. The stirrups are arranged, on each disc, in one or more circumferentially extending series. The alloy resistance ribbon $v$ is threaded through these stirrups, the ribbon being passed through a stirrup $s$ on the top disc $p$, then through a stirrup $s'$ on the bottom disc $p'$, then through a stirrup $s$ on the top disc $p$, and so on alternately around the circumference of the skeleton. $w$ is the asbestos covering. It will be observed that the stirrups are so positioned and the resistance ribbon so threaded that, when the electric circuit is closed, a large illuminated surface of the incandescent ribbon is exposed. Different methods of winding the ribbon are of course feasible.

By employing the type of heater described, the substance whose critical pressure is to be determined, if it be, for example, a hydrocarbon oil having a critical temperature approximating 875° F., may be raised from room temperature to 700° F., in from 4½ to 6½ minutes and from 700 F. to the critical temperature in less than two and one-half minutes.

The heating unit $g$ may be suspended in any suitable way so as to be vertically movable. We have shown a frame or standard comprising several upright rods $h$ (only two are shown), which frame, at its top, carries pulley $i$, over which extends chains $k$ secured to a bale $m$ on the heating unit. When the heating unit is in its elevated position it clears the top of the cylinder $a$ and may be held in that position by any means, such as by the engagement of the chains with a hook $p$ extending back from the frame. Adjustably secured to the frame is a rest or abutment $n$, which limits the downward movement of the heating unit and supports it while the cylinder $a$ is being heated.

Any suitable means for reading the temperature of the substance, such as thermocouples inserted through spark plugs, or a thermocouple well placed at the end of the screw plug and extending into the tube, may be used; but we have found that means specially devised by us give more reliable results, without danger of leakage of the thermocouples and without the "thermocouple lag" that is experienced with thermocouples immersed in the substance. This specially devised means comprises drilling a hole or pocket $o$ in the cylinder $a$ from near the head of the plug $c$ to a depth of about 3½ inches or less and inclined slightly inward to bring its lower end or bottom near the inner wall of the cylinder; the thermocouple being inserted in this hole. Since, however, the position of the thermocouple is between the hottest zone (the outside wall of the cylinder) and the coolest zone (the sample of the substance being tested), its readings are higher than the actual temperature of the sample at any particular instant, if the cylinder $a$ is entirely surrounded throughout its length by the heating unit $g$. A calculated allowance may be made for this difference, but it is found possible to equalize the two temperatures by so positioning the heating unit, while in heat transfer position, that its top will be a short distance below the top of the cylinder, whereby sufficient heat is radiated from the top of the cylinder, when the rate of heating is maintained constant, to balance the temperature difference. Readings with this arrangement have been compared with the results attained by known means for determining the critical pressures of stable substances and they have been found to coincide.

In Fig. 5 is shown a thermocouple which may be substituted for that hereinbefore described. A spark plug 10, comprising iron and constantor wires 11 cemented in porcelain, is held by an adapter 12 which is threaded on the upper end of a seamless steel tube 13. The inner diameter of tube 13 is slightly larger than the outer diameter of the two hole thermocouple insulation 14. The lower end of tube 13 has threaded thereon a plug 15, which, like plug $c$ in Fig. 2, closes the end of the cylinder $a$. Depending from the plug 15 is a tube 16 forming a guide to hold the lower end of the thermocouple. The end 17 of the thermocouple is immersed in the oil.

The vertical position of the heater should be shifted in accordance with the critical temperatures of the different materials whose critical pressures are to be determined. For example, in the case of a material having a critical temperature of 875° F. (483.3° C.) the top of the heating unit $g$ should be $\tfrac{1}{16}$ of an inch below the top of the cylinder $a$; while in the case of a material having a critical temperature of 552° F. (288.9° C.) the heating unit should be lowered until its top is about one inch below the top of the cylinder. Of course the data given are those applicable to a construction having the dimensions which we have given. It must be understood, however, that those dimensions are illustrative merely, and that our invention is not limited thereto nor to any particular structural details that are not recited in the claims.

While the described apparatus was more particularly devised for the purpose of determining critical pressures of hydrocarbons, it will be understood that it is available for determining the critical pressures of other materials and that it may also be used for ascertaining the vapor pressures of hydrocarbons and other vaporizable liquids at different temperatures.

The liquid whose critical pressure is to be determined is placed in the cylinder $a$, the cylinder being filled to about one-third its capacity. The annular electric heating unit is then lowered into the dotted line position shown in Fig. 1, in which position it surrounds the heater. The electric circuit is then closed and the liquid heated to its critical temperature, at which time the pressure gauge will indicate the critical pressure of the substance.

What we claim and desire to protect by Letters Patent is:

1. A critical pressure determination apparatus comprising a vertically positioned cylinder for containing the substance whose critical pressure is to be determined, a pressure registering gauge in communication at the lower end of the cylinder with its interior, an annular heating unit adapted to surround and transfer heat to the cylinder and which is movable vertically into and out of heat transfer relation therewith.

2. A critical pressure determination apparatus comprising a cylinder for containing the substance whose critical pressure is to be determined, a pressure registering gauge in communication with the interior of the cylinder, an annular heating unit adapted to surround and transfer heat to the cylinder and which is movable in the direction of longitudinal extension of the cylinder into and out of heat transfer relation therewith, said heating unit comprising means adapted to be heated by an electric current and to transfer radiant heat to the cylinder while the electric circuit is closed and to cease heat transfer when the electric circuit is opened.

3. A critical pressure determination apparatus comprising a vertically positioned cylinder for containing the substance whose critical pressure is to be determined, a pressure registering gauge in communication with the interior of the cylinder, and an annular heating unit adapted to surround the cylinder, the wall of said cylinder being provided with a well for the reception of a thermocouple, said heating unit being movable along its axis relative to the cylinder to allow a predetermined minor part of the cylinder to project beyond the heating unit in order to equalize the temperature of the thermocouple and the temperature of the substance contained in the cylinder.

4. A critical pressure determination apparatus comprising, a pressure registering gauge, a vertically positioned tube communicating at its lower end with said pressure gauge and extending above the same, a vertically positioned cylinder adapted to contain the substance whose critical pressure is to be determined and arranged above the tube and communicating at its lower end with the upper end of the tube, an electrically heatable annular heating unit adapted to surround and thereby heat the cylinder, and means to move the heating unit vertically into and out of heat transfer relation with the cylinder.

5. A critical pressure determination apparatus comprising a cylinder for containing the substance whose critical pressure is to be determined, a pressure registering gauge, means providing a passage of restricted diameter communicating at one end with the cylinder and at the other end with the pressure gauge, and an electrically heatable annular heating unit adapted to surround and thereby heat the cylinder.

6. A critical pressure determination apparatus comprising a cylinder for containing the substance whose critical pressure is to be determined, a pressure registering gauge below the cylinder, a tube connecting the pressure gauge and the lower end of the cylinder, a rod extending within the bore of the tube and having a diameter less than, but nearly equal to, the diameter of the bore of the tube, and heating means adapted to surround the cylinder.

7. An apparatus for determining the critical pressure of a substance having a known critical pressure, which comprises a cylinder for containing the substance whose critical pressure is to be determined, an annular heating unit adapted to surround and transfer heat to the cylinder and the substance contained therein and which is movable in the direction of longitudinal extension of the cylinder into and out of heat transfer relation therewith, a device connected with the cylinder and adapted to indicate the temperature of the substance therein being heated, and a pressure registering gauge in communication with the interior of the cylinder, whereby when the substance being heated reaches its known critical temperature as indicated by the temperature indicating device, the critical pressure of the substance may be determined by inspection of the pressure registering gauge.

GELLERT ALLEMAN.
AUGUSTINE FRANCIS STEPHEN MUSANTE.